US010394552B2

(12) United States Patent
Elkabany (10) Patent No.: US 10,394,552 B2
(45) Date of Patent: Aug. 27, 2019

(54) INTERFACE DESCRIPTION LANGUAGE FOR APPLICATION PROGRAMMING INTERFACES

(71) Applicant: Dropbox, Inc., San Francisco, CA (US)

(72) Inventor: Ken Elkabany, San Francisco, CA (US)

(73) Assignee: DROPBOX, INC., San Francisco, CA (US)

(*) Notice: Subject to any disclaimer, the term of this patent is extended or adjusted under 35 U.S.C. 154(b) by 85 days.

(21) Appl. No.: 15/215,399

(22) Filed: Jul. 20, 2016

(65) Prior Publication Data

US 2017/0337052 A1    Nov. 23, 2017

Related U.S. Application Data

(60) Provisional application No. 62/337,797, filed on May 17, 2016.

(51) Int. Cl.
*G06F 8/71* (2018.01)
(52) U.S. Cl.
CPC ..................... *G06F 8/71* (2013.01)
(58) Field of Classification Search
CPC ..... G06F 8/10; G06F 8/71; G06F 8/73; G06F 8/20; G06F 8/22; G06F 8/24; G06F 8/35; G06F 8/36; G06F 8/40; G06F 8/70; G06F 8/76; G06F 8/44; G06F 8/447
USPC .............................. 717/120, 121, 122, 123
See application file for complete search history.

(56) References Cited

U.S. PATENT DOCUMENTS

| | | | | |
|---|---|---|---|---|
| 5,864,862 | A * | 1/1999 | Kriens | G06F 8/24 |
| 5,884,317 | A * | 3/1999 | Cline | G06F 8/00 |
| 6,571,297 | B1 * | 5/2003 | Cline | G06F 9/465 |
| | | | | 719/328 |
| 6,971,093 | B1 * | 11/2005 | Spring | G06F 8/71 |
| | | | | 717/170 |
| 7,369,984 | B2 * | 5/2008 | Fairweather | G06F 8/427 |
| | | | | 704/8 |

(Continued)

OTHER PUBLICATIONS

Wikipedia, "Comparison of data serialization formats", May 16, 2016, last retrieved from https://en.wikipedia.org/wiki/Comparison_of_data_serialization_formats&oldid=720561718 on Aug. 5, 2018. (Year: 2016).*

(Continued)

*Primary Examiner* — Andrew M. Lyons
(74) *Attorney, Agent, or Firm* — Polsinelli PC (57) ABSTRACT

An application programming interface (API) analysis engine can validate and parse an API specification. It can determine if the API specification (or portion thereof) contains major or minor changes from a previous version of the API specification. The analysis engine can create an intermediate representation of the API. Using the intermediate representation, the analysis engine can generate multiple outputs, such as a client-side SDK, library, etc. as well as documentation and server-side programs. The analysis engine can compare the API specification with a previous API specification and determine backwards compatibility for the API specification. The analysis engine can assign a version number to the API specification. The analysis engine can also provide developer feedback regarding changes that have been made.

20 Claims, 3 Drawing Sheets

(56) References Cited

U.S. PATENT DOCUMENTS

| | | | | |
|---|---|---|---|---|
| 7,774,746 | B2* | 8/2010 | Mansfield | G06F 17/227 704/2 |
| 7,844,639 | B2* | 11/2010 | Cohen | G06F 17/30297 707/803 |
| 7,853,676 | B1* | 12/2010 | Freskos | H04L 41/0266 709/201 |
| 8,069,435 | B1* | 11/2011 | Lai | G06Q 10/10 717/106 |
| 8,117,589 | B2 | 2/2012 | Christensen | |
| 8,151,257 | B2* | 4/2012 | Zachmann | G06F 8/67 717/170 |
| 8,365,138 | B2* | 1/2013 | Iborra | G06F 8/30 717/104 |
| 8,893,077 | B1 | 11/2014 | Aiuto et al. | |
| 8,949,792 | B2 | 2/2015 | Paterson et al. | |
| 9,058,343 | B2* | 6/2015 | Cohen | G06F 17/30297 |
| 9,229,790 | B2 | 1/2016 | Pierson et al. | |
| 9,678,728 | B1* | 6/2017 | Shemer (UDI) | G06F 8/443 |
| 2002/0062475 | A1* | 5/2002 | Iborra | G06F 8/30 717/108 |
| 2005/0044197 | A1* | 2/2005 | Lai | G06Q 10/10 709/223 |
| 2005/0071803 | A1* | 3/2005 | Cherdron | G06F 8/20 717/101 |
| 2007/0124439 | A1* | 5/2007 | Shah | G06F 9/54 709/223 |
| 2008/0082560 | A1* | 4/2008 | Agrawal | G06F 17/2247 |
| 2009/0125892 | A1* | 5/2009 | Crewdson | G06F 8/10 717/136 |
| 2010/0306757 | A1* | 12/2010 | Becker | G06F 8/71 717/170 |
| 2012/0272221 | A1* | 10/2012 | Pessoa | G06F 9/4492 717/127 |
| 2013/0055291 | A1 | 2/2013 | Pierson et al. | |
| 2014/0122026 | A1* | 5/2014 | Aberg | G06F 17/5009 703/1 |
| 2014/0289699 | A1* | 9/2014 | Paterson | G06F 11/3664 717/106 |
| 2014/0366011 | A1* | 12/2014 | Rector | G06F 8/71 717/170 |
| 2015/0324192 | A1* | 11/2015 | Murphy | G06F 8/20 717/120 |
| 2016/0054982 | A1* | 2/2016 | Itani | G06F 8/36 717/105 |
| 2017/0286077 | A1* | 10/2017 | Haswell | G06F 8/436 |

OTHER PUBLICATIONS

"UML Class diagram C++ struct," Stack Overflow, last retrieved from https://stackoverflow.com/questions/19346532/uml-class-diagram-c-struct on Oct. 19, 2018. (Year: 2013).*

"What do I use for a variant in a UML class diagram?" Stack Overflow, last retrieved from https://softwareengineering.stackexchange.com/questions/263130/what-do-i-use-for-a-variant-in-a-uml-class-diagram on Dec. 21, 2018. (Year: 2014).*

L. Bahler et al., "Experience with a model-driven approach for enterprise-wide interface specification and XML schema generation," 7th IEEE Int'l Enterprise Distributed Object Computing Conference, 2003. Proc., Brisbane, Queensland, Australia, 2003, pp. 288-295. (Year: 2003).*

R. Pandita, X. Xiao, H. Zhong, T. Xie, S. Oney and A. Paradkar, "Inferring method specifications from natural language API descriptions," 2012 34th International Conference on Software Engineering (ICSE), Zurich, 2012, pp. 815-825. (Year: 2012).*

A. Torres, R. Galante and M. S. Pimenta, "Towards a UML Profile for Model-Driven Object-Relational Mapping," 2009 XXIII Brazilian Symposium on Software Engineering, Fortaleza, Ceara, 2009, pp. 94-103. (Year: 2009).*

* cited by examiner

INTERFACE DESCRIPTION LANGUAGE FOR APPLICATION PROGRAMMING INTERFACES

CROSS REFERENCE TO RELATED APPLICATIONS

This application claims the benefit of U.S. provisional application No. 62/337,797, filed on May 17, 2016, which is expressly incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

REFERENCE TO COMPUTER PROGRAM LISTINGS

Submitted electronically herewith in ASCII text file format is a computer program listing for files entitled base.py, dropbox.py, and files.py. The file base.py has a size of 78,371 bytes, the file dropbox.py has a size of 19,095 bytes, and the file files.py has a size of 222,071 bytes. The disclosure of the files base.py, dropbox.py, and files.py are incorporated by reference. Below, the files base.py, dropbox.py, and files.py are also called Appendix C, Appendix D, and Appendix E, respectively.

BACKGROUND

Designing and implementing an application programming interface (API) presents multiple challenges. For example, for a network-based API, there are an innumerable number of protocols and serialization formats that two hosts can use to communicate. Gaining widespread adoption can also be difficult because software developers, such as individual developers and organizations, may prefer certain programming languages (e.g., Java®, C, C++, Python, C#, R, PHP, JavaScript®, Ruby, MATLAB®, etc.), programming paradigms or styles (e.g., procedural, object-oriented, imperative, functional, declarative, etc.), and/or data exchange formats (e.g., Extensible Markup Language (XML), JavaScript® Object Notation (JSON), comma-separated values (CSV), etc.). These preferences may abruptly change. For instance, the recent shift from XML to JSON over HTTP exemplifies how preferred interface formats can seemingly change overnight. Furthermore, once an API has been established, it may become necessary to modify an API method or endpoint, such as a number of inputs and/or outputs, input and/or output data type(s), input and/or output format, among other changes. Systems that implement the API may be required to support previous versions as well as the latest versions. Managing an API across multiple programming languages and platforms, programming paradigms, and versions introduces inconsistencies and errors and hinders adoption of the API.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for creating, reading, and implementing an API specification.

An application programming interface (API) analysis engine can validate and parse an API specification. It can determine if the API specification (or portion thereof) contains major or minor changes from a previous version of the API specification. The analysis engine can create an intermediate representation of the API. Using the intermediate representation, the analysis engine can generate multiple outputs, such as a client-side SDK, library, etc. as well as documentation and server-side programs. The analysis engine can also provide developer feedback regarding changes that have been made.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for creating, reading, and implementing an API specification.

Figure 1:
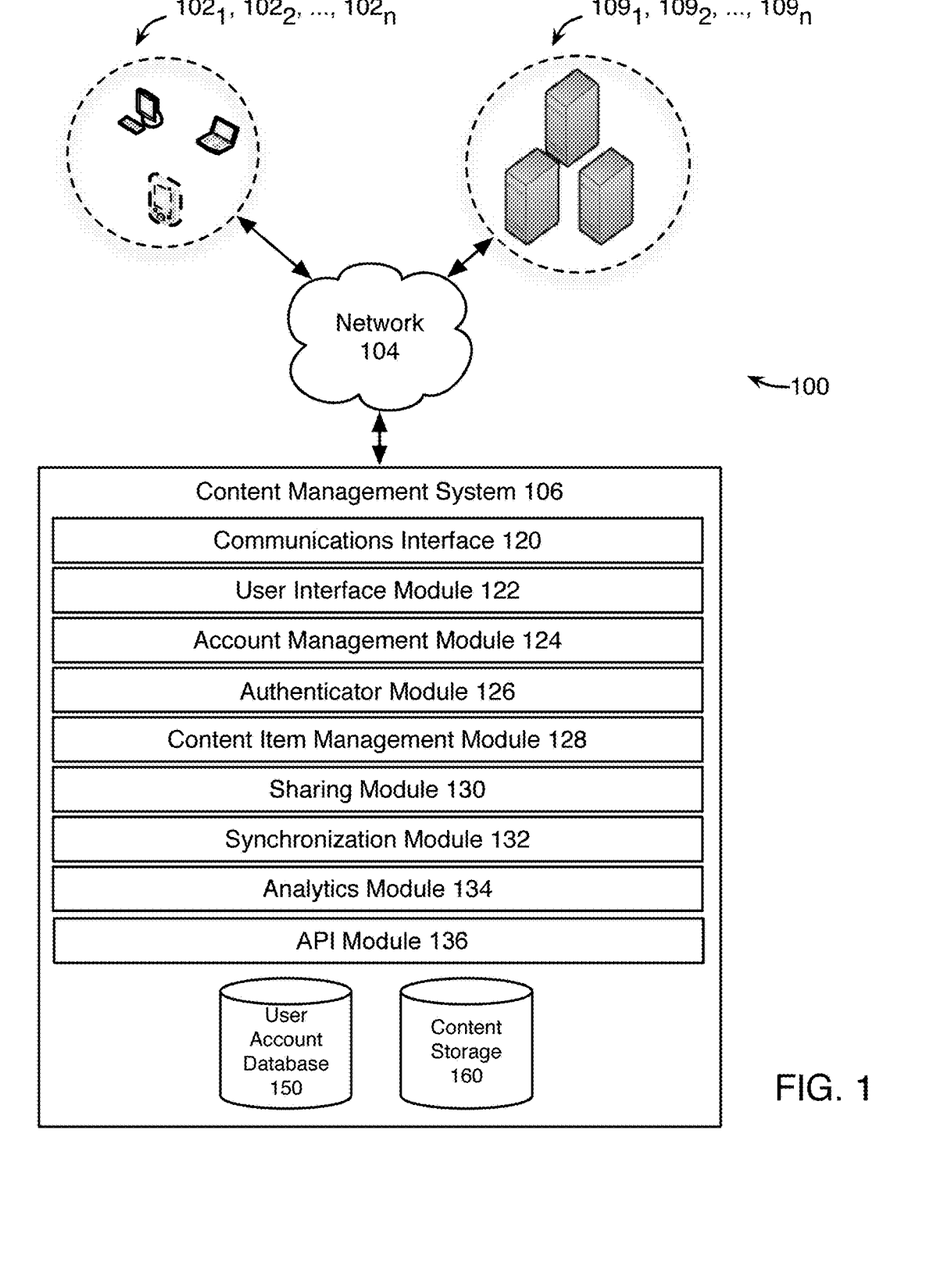
FIG. 1 shows an exemplary configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, . . . , $102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1$, $109_2$, . . . , $109_n$ (collectively "109") via an application programming interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

Content management system 106 can include API module 136, which includes a set of RESTful API endpoints. For example, API module 136 can have a generate_SDK endpoint which receives API specification and targeted programming language/platform, and outputs specified SDK. API module 136 can have analyze_versions module which receives a pair of API specs and outputs developer feedback regarding major and minor changes.

In some embodiments, the present technology may be implemented as a command line interface, such as disclosed in Appendix A, which is incorporated herein by reference.

While content management system 106 is presented with specific components, it should be understood by one skilled in the art, that the architectural configuration of system 106 is simply one possible configuration and that other configurations with more or fewer components are possible.

Figure 2:
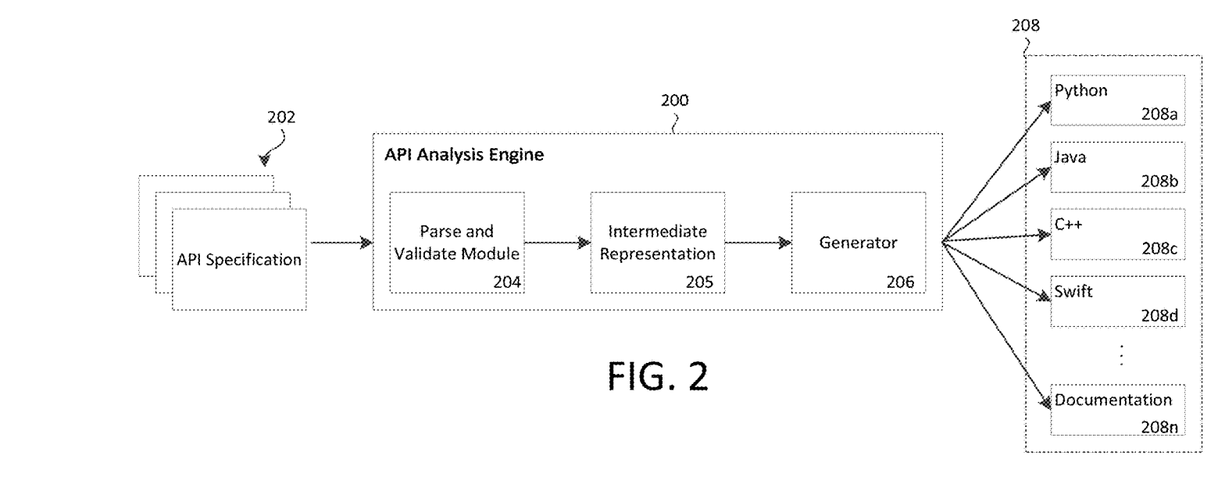
FIG. 2 shows an exemplary logical component diagram for translating an API specification into one or more software development kits.

FIG. 2 shows an exemplary logical component diagram 200 for receiving an API specification and generating one or more software development kits, which includes API specification 202, API analysis engine 204, and a plurality of software development kits 206. API analysis engine 200 can be run as a service of content management system 106. API specification 202 can include a single resource (e.g., a single file, path, location, or item) or multiple resources in combination. API specification 202 can describe data, datatypes, fields, etc. API specification 202 can describe routes (e.g., API endpoints) whereby a user can set or get data. API specification 202 can be written using an interface description language (IDL). An exemplar API specification is disclosed as Appendix B, which is incorporated herein by reference.

The data types can include structs (called a "product type" in type theory, where all of one or more fields are defined and used) and tagged unions (called a "sum type" in type theory, where one of many fields can be used). For example, a struct labelled "person" can include a string "name", an integer "age", and a Boolean "married". In comparison, a union called "last login" can be a Boolean "hasLoggedIn" or a string "date"; that is, if a user has not yet logged in, the union can contain "lastLoggedIn" with a value of false instead of containing the string "date" with the date that the user last logged in. A struct and a tagged union can include or describe fields such as strings, integers, floating point numbers, pointers, binary data, voids (an undefined data type), or any other data type. API specification 202 can describe validation parameters for the data types. Validation parameters can take the form of a regular expression or similar (e.g., ^[^@]+@[^@]+\.[^@]+$" can be used to validate an email address). Structs and tagged unions can describe example instantiations of the respective data type. API specification 202 can indicate that a field is optional or required.

In some embodiments, a struct can be a user-defined type made up of fields that have their own types, for example:

```
struct BasicAccount
    "Basic information about a user's account.
This can be multi-line."
    account_id AccountId
        "A unique identifier for the user's
account."
    email String(pattern="^[^@]+@[^@]+\.[^@]+$")
        "The e-mail address of the user. "
```

In some embodiments, a struct can be documented by specifying a string immediately following the struct declaration. The string can be multiple lines, as long as each subsequent line is at least at the indentation of the starting quote.

After the documentation can be a list of fields. Fields can be formatted with the field name first followed by the field type. To provide documentation for a field, a string on a new indented line following the field declaration can be specified.

In some embodiments, a struct can inherit from another struct using a keyword, such as 'extends.' For example, the struct can declare itself a subtype of another struct, which may be known as the supertype. The subtype may inherit all the fields of the supertype. For instance:

```
struct Account extends BasicAccount
    "Account inherits account_id and email from
BasicAccount."
```

In some embodiments, user-defined types can be composed of other user-defined types, such as structs or unions. For example:

```
union Status
    active
        "The account is active."
    inactive Timestamp("%a, %d %b %Y %H:%M:%S")
        "The account is inactive. The value is when
the account was deactivated."
    struct Account extends BasicAccount
        "Information about a user's account."
    name String(min_length=1)?
        The user's full name. :val:'null' if no
name was provided."
    status Status
        "The status of the account."
```

In some embodiments, a field with a primitive type can have a default set, for example, with an "=" followed by a value at the end of the field declaration:

```
struct Example
    number UInt64 = 1024
    string String = "hello, world."
```

In some embodiments, setting a default can mean that a field is optional. If it is not specified in a message, a function, data structure, or other software element for receiving the struct (i.e., "receiver") should not error, but can instead return the default when the field is queried. The receiver should, however, track the fact that the field was unspecified, so that if the message is re-serialized the default is not present in the message.

In some embodiments, a default cannot be set for a nullable type. Nullable types implicitly have a default of null. In some embodiments, a default can be set for a field with a union data type, but only to a union member with a void type. For instance, using the example of an Account user-defined data structure, the status can be set to active by default:

```
struct Account extends BasicAccount
    "Information about a user's account."
    name String (min_length=1)?
    "The user's full name. :val:'null' if no
name was provided."
    status Status = active
    "The status of the account."
```

In some embodiments, a specification can include examples, which may provide realistic samples of data in definitions. This can gives spec readers a concrete idea of what typical values will look like. Also, examples can help demonstrate how distinct fields might interact with each other. Generators can have access to examples, which can be useful when automatically generating documentation.

In some embodiments, an example may be declared by using the "example" keyword followed by a label. By convention, "default" should be used as the label name for an example that can be considered a good representation of the general case for the type, for example:

```
struct Account extends BasicAccount
    "Information about a user's account."
    name String (min_length=1)?
    "The user's full name. :val:'null' if no
name was provided."
    status Status
    "The status of the account."
    example default
        "A regular user"
        account_id = "id-48sa2f0"
        email = "alex@example.org"
        name = "Alexander the Great"
        status = active
    example unnamed
        "An anonymous user"
        account_id = "id-29sk2p1"
        email = "anony@example.org"
        name = null
        status = active
```

In some embodiments, every required field (not nullable and no default) can be specified, otherwise an error may be returned. In some embodiments, "null" can be used to mark that a nullable type is not present. In some embodiments, an optional multi-line documentation string can be specified after the line declaring the example and before the example fields.

When there are a set of nested types, each type defines examples for its fields with primitive types. For fields with composite types, the value of the example should be a label of an example in the target composite type. An example of where Name is now its own struct:

```
struct Account extends BasicAccount
    name Name
    example default
        account_id = "id-48sa2f0"
        email = "alex@example.org"
        name = default
        status = active
    example anonymous
        account_id = "id-29sk2p1"
        email = "anony@example.org"
```

```
        name = anonymous
        status = active
struct Name
    first_name String?
    example default
        first_name = "Alexander the Great"
    example anonymous
        first_name = null
```

In this situation, an anonymous example for Account explicitly references the anonymous example for Name.

In some embodiments, examples for unions may only specify one field, since only one union member can be selected at a time. For example:

```
union Owner
    nobody
    account Account
    organization String
    example default
        nobody = null
    example person
        account = default
    example group
        organization = "Company"
```

In the default example, void tags can be specified with a value of null. In the person example, the default example for the Account type is referenced.

In some embodiments, lists can be expressed with bracket notation:

```
struct S
    l1 List(String)
    l2 List(T)
    l3 List(List (T))
    example default
        l1 = ["hello", "world"]
        l2 = [start, end]
        l3 = [[start], [ ]]
struct T
    i UInt64
    example start
        i = 0
    example end
        i = 42
```

In some embodiments, a union can be a tagged union. For example, a union can be a type that can store one of several different possibilities at a time. Each possibility may an identifier that may be referred to as a "tag." In one example, the union Status can have tags active and inactive:

```
union Status
    "The status of a user's account"
    active
        "The account is active."
    inactive Timestamp ("%a, %d %b %Y %H:%M:%S")
        "The account is inactive. The value is
when the account was deactivated."
```

A tag can be associated with a type ("inactive" in the example above stores a Timestamp). If the type is omitted as in the case of active, the type can be implicitly Void.

One advantage of a union is its logical expressiveness. Some types can best be described as choosing between a set of options. Another advantage is that for programming languages that support tagged unions, the compiler can check that supplied application code handles all possible cases and that accesses are safe. Generators can take advantage of such features when they are available in the target language. In some embodiments, documentation string can follow the union declaration and/or follow each tag definition.

In some embodiments, unions can be closed by default. That is, for the sake of backwards compatibility, a function, data structure, or other software element for receiving a struct (i.e., "recipient") ideally should not encounter a tag that it is not aware of. A recipient can therefore confidently handle the case where a user is active or inactive (e.g., in the above example) and trust that no other value will ever be encountered. The catch-all tag can help overcome limitations of this principle which otherwise might constrict APIs undergoing evolution. For example, if a recipient receives a tag that it isn't aware of, it can default the union to the catch-all tag.

API specification 202 can have an indication (e.g., an asterisk "*") following a tag with an omitted type, i.e. its type is Void, for example:

```
union GetAccountErr
    no_account
        "No account with the requested id could
    be found."
    perm_denied
        "Insufficient privileges to query
    unknown*
```

In the example above, a recipient should have written code to handle no_account, perm_denied, and unknown. If a tag that was not previously known is received (e.g., bad_account), the union will default to the unknown tag.

This can be especially useful for unions that represent the possible errors a route might return. Recipients may have been generated with only a subset of the current errors, but they'll continue to function appropriately as long as they handle the catch-all tag.

Using the extends keyword, a union can declare itself as a supertype of another union, which can be known as the subtype. In some embodiments, the supertype will have all the tags of the subtype, for example:
    union DeleteAccountError extends GetAccountError DeleteAccount, in the example above, inherits the tags no_account, perm_denied, and unknown from GetAccountError. Since GetAccountError has already defined a catch-all tag, DeleteAccountError or any other supertype cannot, in this example, declare another catch-all.

In some embodiments, the supertype/subtype relationship created by "extends" between two unions is the opposite of an "extends" between two structs. It can be stated this way to maintain the invariant that a subtype may be used in place of a supertype. Specifically, a GetAccountError can be used in place of DeleteAccountError because a handler will be prepared for all possibilities of GetAccountError since they are a subset of DeleteAccountError.

If a struct enumerates its subtypes, an instance of any subtype can satisfy the type constraint. This can be useful when wanting to discriminate amongst types that are part of the same hierarchy while simultaneously being able to avoid discriminating when accessing common fields.

To declare the enumeration, API specification 202 can define a union following the documentation string of the struct if one exists. Unlike a regular union, it can be unnamed. Each member of the union can specify a tag followed by the name of a subtype. In some embodiments, the tag (known as the "type tag") is present in the serialized format to distinguish between subtypes. For example:

```
struct Resource
    "Sample doc."
    union
        file File
        folder Folder
    path String
struct File extends Resource:
    ...
struct Folder extends Resource:
    ...
```

In the above example, anywhere Resource is referenced, an instance of File or Folder satisfies the type constraint.

In some embodiments, a struct that enumerates subtypes cannot inherit from any other struct. Type tags cannot match any field names.

Similar to a union, a struct with enumerated types can be labeled as a catch-all. This is done by appending an asterix, *, to the union, for example:

```
struct Resource
    "Sample doc."
    union*
        file File
        folder Folder
    path String
struct File extends Resource:
    ...
struct Folder extends Resource:
    ...
```

In some embodiments, if recipient receives a tag for a subtype that it is unaware of, it will substitute the base struct in its place if it's a catch-all. In the example above, if the subtype is a Symlink (not shown), then the recipient will return a Resource in its place.

In some embodiments, when a type is followed by a ?, the type is nullable, for example:
    name String(min_length=1)?

Nullable can mean that the type can be unspecified, ie. null. Code generators can use a language's native facilities for null, boxed types, and option types if possible. For languages that do not support these features, a separate function to check for the presence of a type is the preferred method.

A nullable type can be considered optional. If it is not specified in a message, the receiver should not error, but instead treat it as absent.

Routes can correspond to API endpoints, for example:

```
route get_account (GetAccountReq, Account,
    GetAccountErr)
        "Get information about a specified user's
    account."
```

The route in the above example is named get_account. GetAccountReq is the data type of the request to the route. Account is the data type of a response from the route. GetAccountErr is the data type of an error response.

Similar to structs and unions, a documentation string can follow the route signature.

A full description of an API route tends to require vocabulary that is specific to a service. For example, an API may need a way to specify some routes as including a binary body (uploads) for requests. Another example is specifying which routes can be used without authentication credentials.

To cover this open-ended use case, routes can have a section which can be called "attrs" declared followed by an arbitrary set of key=value pairs, for example:

```
route ping (Void, Void, Void)
    attrs
        key1 = "value1"
        key2 = 1234
        key3 = 3.14
        key4 = false
        key5 = null
```

A value can reference a union tag with void type, for example:

```
route ping (Void, Void, Void)
    attrs
        key = Letters.a
    union Letters
        a
        b
        c
```

Code generators can then populate a route object with these attributes.

A route can be marked as deprecated as follows:
route old_route (Arg, Void, Void) deprecated If the route is deprecated in favor of a newer route, use deprecated by followed by the new route's name, for example:

```
route old_route (Arg, Void, Void) deprecated by
new_route
route new_route (NewArg, NewResult, Void)
```

Types and aliases in other namespaces can be referred to by using an import directive.

For example, the definition of AccountId and BasicAccount can be moved into a file called common.babel:

```
namespace common
    # Define an AccountId as being a 10-character
string
    # once here to avoid declaring it each time.
    alias AccountId = String(min_length=10,
max_length=10)
    struct BasicAccount
        "Basic information about a user's account."
        account_id AccountId
            "A unique identifier for the user's
account."
        email String(pattern="^[_@]+@[_@]+\.[_@]+$")
            "The e-mail address of the user."
```

Now in users.babel, an import statement under the namespace directive can be added as follows:

```
namespace users
    import common
```

When referencing data types in common, use the prefix common. For example, common.AccountId and common.BasicAccount.

Documentation strings can be an important part of specifications, they can be attached to routes, structs, struct fields, unions, and union options. It is expected that most elements should be documented. It is not required only because some definitions are self-explanatory or adding documentation would be redundant, as is often the case when a struct field (with a doc) references a struct (with a doc).

Documentation can be accessible to generators. Code generators can inject documentation into the language objects that represent routes, structs, and unions. Generators for API documentation will find documentation strings especially useful.

References can help generators tailor documentation strings for a target programming language.

References can have the following format:
:tag:'value'

Supported tags can include: route, type, field, link, and val.

route—A reference to a route. The value should be the name of the route. Code generators should reference the class or function that represents the route.

type—A reference to a user-defined data type (Struct or Union). The value should be the name of the user-defined type.

field—A reference to a field of a struct or a tag of a union. If the field being referenced is a member of a different type than the docstring, then use the format TypeName.field_name. Otherwise, the field name can be used as the value.

link—A hyperlink. The format of the value is <title ...> <uri>, e.g. Babel Repo https://github.com/babelapi. Everything after the last space can be considered the URI. The rest can be treated as the title. For this reason, URIs should be percent encoded. Generators can convert this to a hyperlink understood by the target language.

val—A value. Supported values include null, true, false, integers, floats, and strings. Generators can convert the value to the native representation of the value for the target language.

API specification 202 can include comments describing data types (e.g., structs, tagged unions, and their contents), routes, the API in general, etc. API specification 202 can include error messages (e.g., associated with inputs that fail validation). Data types and routes can inherit and extend other data types and routes.

API specification 202 can describe the input (e.g., arguments) and the output (e.g., output and/or error) of a route/endpoint. API specification 202 can include legacy routes that have been deprecated by other routes. A legacy routes can indicate that it is deprecated and point to the current route.

API specification 202 can include additional attributes for informing an intermediate representation 205 or generator 206. For example, such additional attributes can include preprocessor directives such as validation parameters that may be repeated, "magic numbers", etc. The additional attributes can specify a protocol (e.g., HTTP, FTP, etc.), format (e.g., JSON, XML, etc.) for the API to communicate using. The additional attributes can specify a server location, type, identity, etc. that will host the API route. The additional attributes can provide instructions on how to handle errors; for example, a generated output 208 can include an instruction to attempt a retry on failure or to drop the connection on failure.

API specification 202 can be divided into namespaces for identifying logical groupings of routes and data types. API specification 202 can identify access types (e.g., "private", "partner", or "public") and access levels (e.g., "read-only", "modify", etc.). Access types and access levels can be monitored and controlled in output 208. When the analysis engine processes the namespaces it can generate a module for each namespace. A client-side output file can then be generated for each module in a first and second programming language.

API analysis engine 200 can receive API specification 202. It can first process API specification 202 in parse and validate module 204. Parse and validate module 204 can check API specification 202 for inconsistencies, contradictions, errors, etc. If an error or inconsistency is found, it can generate an error report, attempt to fix the error, terminate, or any combination of the foregoing. In some embodiments, API specification can utilize various schema; parse and validate module 204 can intelligently (or with the assistance of format information) determine the specific style or formatting of API specification 202. Validate module 204 can determine that the API specification complies with API specification formatting guidelines.

Intermediate representation 205 can be an object representing the information contained within API specification 202. For example, intermediate representation 205 can include comments, data types, data validation (e.g., for validating input and output data), endpoint usage examples (e.g., example inputs and responses), deprecation information (e.g., "function1 is deprecated by function1New"). API analysis engine 200 can then take intermediate representation 205 and use generator 206 to create one or more output 208. Generator 206 can include various generator templates that instruct API analysis engine 200 how to create respective outputs 208. In some embodiments, API specification 202 identifies a subset of available generator templates in order to create a subset of possible outputs 208. A command line interface can identify the subset of generator templates. A generator template can contain mappings ("byte[ ]->binary", "string->char[ ]", etc.), functions (e.g., a function to convert a date from a string to a Unix date), and any other necessary instructions to guide generator 206 in creating output 208. Exemplar intermediate representations are disclosed as Appendix C, Appendix D, and Appendix E, which are incorporated herein by reference.

In some embodiments, generator 206 identifies codewords (i.e., those used for internal use only), proper nouns, inappropriate language, etc., and replaces them with generic references or other text as appropriate.

Output 208 can be a software development kit (SDK), library, documentation (e.g., documentation 208n), test library, etc. in various formats and languages. For example, an SDK can be in Python 208a, Java 208b, C++ 208c, Swift 208d, etc. Documentation 208n can be a webpage, a document (e.g., PDF), etc. Output 208 can be in one or more spoken languages (e.g., one version of documentation 208n in English and another version in French). Output 208 can be client-side (e.g., an SDK) or server side (e.g., as a header file including abstract classes to be implemented).

A client-side output 208 can validate inputs and outputs while running on client 102. Such an output can also make API requests to an API server. Similarly, a server-side output 208 can validate inputs and outputs as well as receive API requests from a client. For example, server-side output 208 can analyze data as it is to be sent from the server and determine whether it conforms with API specification 202. In some embodiments, API analytics engine can verify that data that is to be sent from the server conforms with API specification 202. If data to be sent form the server is nonconforming, an error can be produced instead of sending nonconforming data.

Using the principles herein disclosed enables a developer to focus their API development on, for example, API specification 202. Dependent outputs 208 can be automatically generated.

Figure 3:
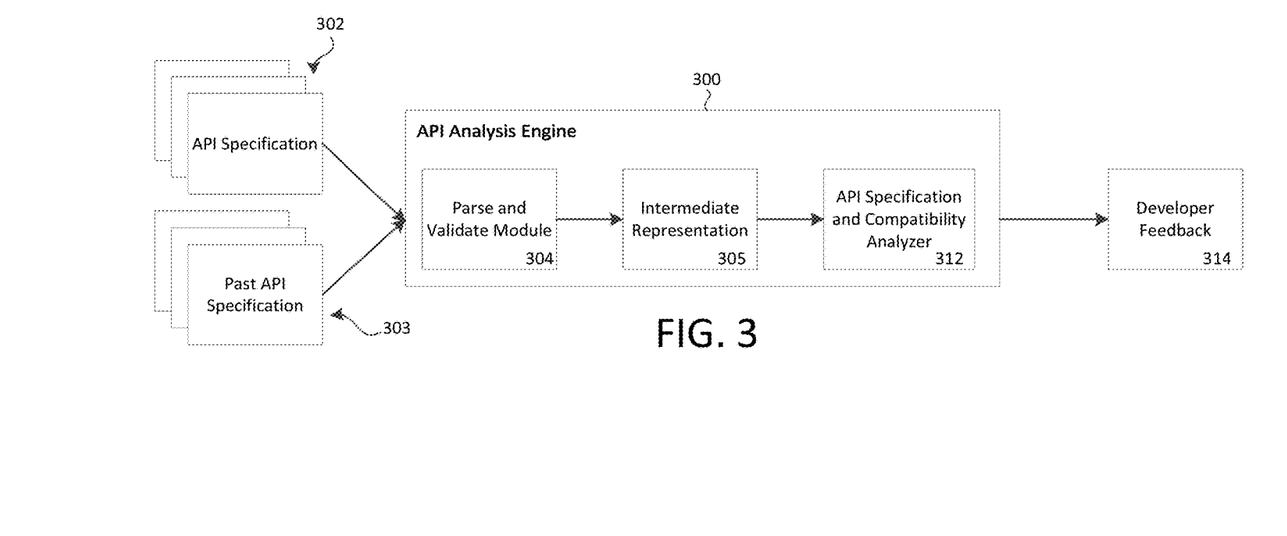
FIG. 3 shows an exemplary logical component diagram for comparing two versions of an API specification and providing developer feedback.

FIG. 3 shows an exemplary logical component diagram 300 for comparing API specification 302 and past API specification 303 to provide developer feedback. For example, past API specification 303 can include past minor versions of an API (e.g., v2.3 when specification 302 is at v2.4) and/or past major versions of an API (e.g., v1.0 when API specification 302 is at v2.0). In some environments, minor version increases should retain compatibility with programs designed for a previous version within the same major version family (e.g., 1.x). It can also be desirable to retain capability with prior major versions as well. Thus, it is important to determine differences between the versions and whether programs written to access a previous version of the API might result in errors. In some embodiments, a version number can have a first part designating the major version and a second part designating a minor version; for example: major.minor or 2.3. The principles disclosed herein can be applied to other numbering conventions as known in the art.

API analysis engine can engage API specification and compatibility analyzer 312. API specification and compatibility analyzer 312 can first detect differences in the respective intermediate representations. Differences in structs, tagged unions, validation parameters, comments, etc. can be identified. Certain differences can generate errors. For example, if the two API specifications 302 and 303 purport to be minor version differences, but API specification 302 defines behavior that would be inconsistent with behavior of past API specification 303, then such a difference can be labeled as an error. This can occur if the new API specification 302 has stricter validation parameters, returns different data, etc. Certain differences can generate warnings. For example, if specification 302 has less strict validation parameters, returns extra information, etc. Warnings can differ from errors in that errors might "break" programs written according to past API specification 303 whereas warnings identify changes that maintain compatibility even if they expand the API. Certain differences can have no or little impact on API functionality; for example, these differences might include changes to help text and comments and can be identified by specification and compatibility analyzer 312.

Past API specification 303 can define data types, routes, etc. that are not present in API specification 302. In some such embodiments, API specification and compatibility analyzer 312 can intelligently merge past API specification 303 and API specification 302. For example, it can detect updates in API specification 302 or where API specification deprecates portions of past API specification 303.

In some embodiments, the result of API specification and compatibility analyzer 312 can indicate whether API specification 302 is a major version (e.g., v1.0 to v2.0) or a minor version (e.g., v1.1 to v1.2). If API specification 302 is backwards compatible with past API specification 303, then API specification 302 can be marked as a minor version; otherwise it can be marked as a major version (e.g., if it determines that the new version is not backwards compatible). As such, API analytics engine 300 can automatically maintain versioning of the API. In some embodiments, the differences detected in API specification 302 only impact server-side code; in such embodiments, generator 306 can be invoked to generate outputs 308 corresponding to the server. If API specification 302 contains changes that affect client code, generator 308 can be instructed to generate client side outputs 308. After client side outputs 308 are generated, such outputs 308 can be pushed to clients automatically. Clients can be notified of available client side output 308.

There are some modifications to an API that are backwards incompatible, i.e., programs designed for the previous API version might break when attempting to connect to the newer version of the API. An example of a backwards incompatible change includes: removing a field from a user defined data type (e.g., "struct"); a program designed for the previous version of the API might have an application-layer dependency on the field that would then no longer exist. Another example of a backwards incompatible change includes changing the type of a field (e.g., from "string" to "integer"); in statically typed languages, this change can break the receiving software. Another example includes adding a new tag to a union without a catch-all tag; an API can expect the receiver of data to handle all tags, if a new tag is returned, the receiver will be unable to handle it. A catchall tag can be a default tag that is executed when the receiver does not have a handler for the actual tag type. Another example can include changing the type of a tag to a non-Void type; for example, changing it from a non-void type; a receiver application might then expect a value of one type and receive a value of another. Another example includes changing any of the types of a route description to an incompatible one; when changing an argument (i.e., an API input), a result (i.e., an API output), or error data type, the change is backwards incompatible if any related operation is backwards incompatible.

There are certain modifications to an API that are backwards compatible, i.e., programs designed for a previous version of the API will not break when attempting to connect to the new version of the API. An example of a backwards compatible change includes adding a new route. Another example includes changing the name of a struct, union, or alias. Another example includes adding a field to a user defined data type (e.g., struct) that is optional or has a default; if the sender is older, the receiver can set the field to the default or mark the field as unset; if the sender is newer, it can send the new field which can then be ignored by the older receiver. Another example includes changing the type of a tag from void to anything else; the older would then ignore information associated with the new data type and continue to present a tag with no value to the application. Another example includes adding another tag to a union that has a catch-all specified; the older receiver would then not understand the incoming tag, and will simply set the union to its catch-all tag.

In some embodiments, specification and compatibility analyzer 312 can test each intermediate representation 305 and keep track of which tests fail and succeed. Testing can include sending the intermediate representation 305 through generator 306 to produce outputs 308; such outputs 308 can be functionally tested. In some embodiments, sample real-world API calls that were used in association with past API specification 303 can be used to test API specification 302.

API specification and compatibility analyzer 312 can identify spelling and grammar issues, including language that does not comply with conventions. It can verify the existence of example cases in API specification 302. It can detect the use of internal code-words.

API analytics engine 300 can use the results of API specification and compatibility analyzer 312 to provide developer feedback 314. Developer feedback 314 can be a file (e.g., a text file describing errors, warnings, or summarizing differences), print statements in a command line, comments embedded within API specification 302 (or a copy of API specification 302), etc. In some embodiments, developer feedback 314 can be incorporated into documentation 308n (e.g., changelogs). Developer feedback 314 can include identifying deprecated routes and inserting them into API specification 302 (with comments as appropriate).

Figure 4A:
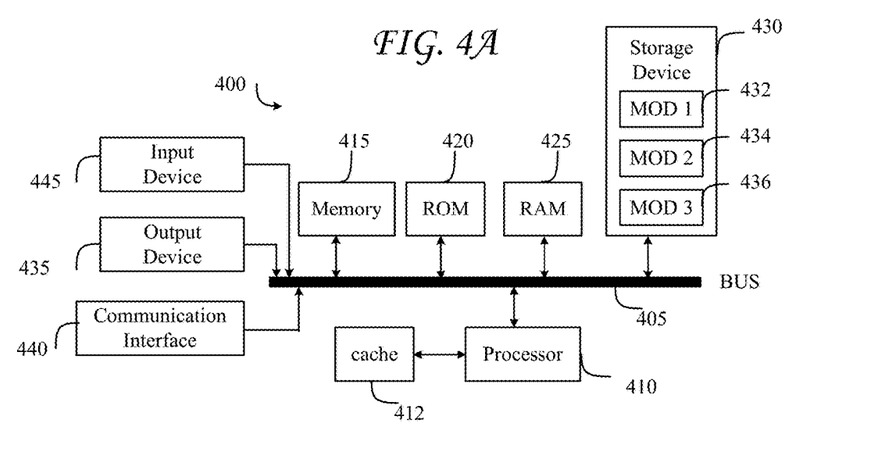
FIG. 4A shows a first exemplary system for implementing various embodiments of the present technology.
Figure 4B:
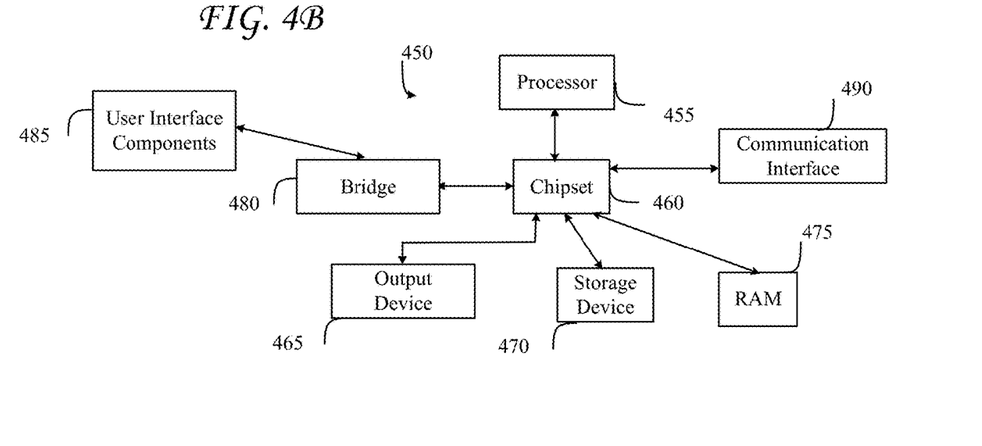
FIG. 4B shows a second exemplary system for implementing various embodiments of the present technology.

FIG. 4A and FIG. 4B show example possible system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. Example system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that example systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   generating an application programming interface (API) specification defining API endpoints using data types that are supported in a plurality of programing languages, the data types comprising structs and tagged unions defining respective input data types and output data types for the API endpoints, the API specification being generated in a language that supports struct and tagged union data types;
   inputting at least a portion of the API specification into an API engine configured to process and convert the at least the portion of the API specification into a target programming language and serialization format, the target programming language being selected from the plurality of programming languages;
   processing and converting, by the API engine using one or more processors, the at least the portion of the API specification into the target programming language and serialization format, to yield a representation of the at least the portion of the API specification in the target programming language and serialization format; and generating, by the API engine using one or more processors, one or more output files based on the representation of the at least the portion of the API specification, the one or more output files defining one or more of the API endpoints and respective input and output data types, the one or more output files comprising code in the target programming language for communicating data via the API endpoints based on the respective input and output data types and the serialization format.

2. The method of claim 1, further comprising:
receiving a second API specification that is an earlier version of the API specification;
determining one or more differences between the API specification and the second API specification;
determining a respective backwards compatibility of the one or more differences;
determining a version number of the API specification based at least in part on the respective backwards compatibility, the version number including at least one of a major number and a minor number; and
incrementing the major number based on at least one of:
removal of a field of a user-defined data structure from the API specification;
a change of a type of the field in the user-defined data structure from the API specification;
an addition of a new tag in a first union of the API specification without a catch-all tag;
a change of the type of a tag of a second union of the API specification with a non-Void type; and
a change of the type of a route.

3. The method of claim 1, further comprising:
receiving a second API specification that is an earlier version of the API specification;
determining one or more differences between the API specification and the second API specification;
determining a respective backwards compatibility of the one or more differences;
determining a version number of the API specification based at least in part on the respective backwards compatibility, the version number including at least one of a major number and a minor number; and
incrementing the minor number based on at least one of:
an addition of a new route to the API specification;
a change of a name of a user-defined data structure of the API specification;
an addition of a field of the user-defined data structure of the API specification that is optional or has a default value;
a change of a type of the user-defined data structure of the API specification from a Void type; and
an addition of a tag to a union of the API specification that has a catch-all.

4. The method of claim 1, wherein generating the one or more output files comprises generating a module for each namespace in the API specification.

5. The method of claim 4, wherein generating the one or more output files comprises:
generating a first respective client-side output file in a first programming language for each module; and
generating a second respective client-side output file in a second programming language for each module.

6. The method of claim 1, wherein the API specification defines, for each of the API endpoints, a request type and a response type without relation to each other such that a type of output from an API endpoint is irrespective of an input to that API endpoint.

7. The method of claim 1, wherein the API specification includes an input validation parameter, the method further comprising:
generating a server-side output file including instructions for implementing the input validation parameter.

8. The method of claim 1, further comprising:
presenting developer feedback corresponding to one or more differences between the API specification and a second API specification that is an earlier version of the API specification.

9. The method of claim 1, further comprising:
determining that the API specification complies with API specification formatting guidelines; and
generating the representation of the API specification at least partly in response to determining that the API specification complies with API specification formatting guidelines.

10. A non-transitory computer-readable medium having computer readable instructions that, when executed by one or more processors, cause the one or more processors to:
receive an application programming interface (API) specification defining API endpoints using data types that are supported in a plurality of programing languages, the data types comprising structs and tagged unions defining respective input data types and output data types for the API endpoints, the API specification being generated in a language that supports struct and tagged union data types;
input at least a portion of the API specification into an API engine configured to process and convert the at least the portion of the API specification into a target programming language and serialization format, the target programming language being selected from the plurality of programming languages;
process and convert, via the API engine, the at least the portion of the API specification into the target programming language and serialization format, to yield a representation of the at least the portion of the API specification in the target programming language and serialization format; and
generate, via the API engine, one or more output files based on the representation of the at least the portion of the API specification, the one or more output files defining one or more of the API endpoints and respective input and output data types, the one or more output files comprising code in the target programming language for communicating data via the API endpoints based on the respective input and output data types and the serialization format.

11. The non-transitory computer-readable medium of claim 10, wherein the instructions, when executed by the one or more processors, further cause the one or more processors to:
receive a second API specification that is an earlier version of the API specification;
determine a respective backwards compatibility of one or more differences between the API specification and the second API specification;
determine a version number of the API specification based at least in part on the respective backwards compatibility, the version number including at least one of a major number and a minor number; and increment the major number based on at least one of:
    removal of a field of a user-defined data structure from the API specification;
    a change of a type of a field in a user-defined data structure from the API specification;
    an addition of a new tag in a union of the API specification without a catch-all tag;
    a change of a type of a tag of a union of the API specification with a non-Void type; and
    a change of a type of a route.

12. The non-transitory computer-readable medium of claim 10, wherein the instructions, when executed by the one or more processors, further cause the one or more processors to:
    receive a second API specification that is an earlier version of the API specification;
    determine a respective backwards compatibility of one or more differences between the API specification and the second API specification;
    determine a version number of the API specification based at least in part on the respective backwards compatibility, the version number including at least one of a major number and a minor number; and
    increment the minor number based on at least one of:
        an addition of a new route to the API specification;
        a change of a name of a user-defined data structure of the API specification;
        an addition of a field of a user-defined data structure of the API specification that is optional or has a default value;
        a change of a type of a user-defined data structure of the API specification from a Void type; and
        an addition of a tag to a union of the API specification that has a catch-all.

13. The non-transitory computer-readable medium of claim 10, wherein generating the one or more output files comprises generating a module for each namespace in the API specification.

14. The non-transitory computer-readable medium of claim 10, wherein generating the one or more output files comprises:
    generating a first respective client-side output file in a first programming language for each module; and
    generating a second respective client-side output file in a second programming language for each module.

15. The non-transitory computer-readable medium of claim 10, wherein the API specification defines, for each of the API endpoints, a request type and a response type without relation to each other such that a type of output from an API endpoint does not change based on a type of input to that API endpoint.

16. The non-transitory computer-readable medium of claim 10, wherein the API specification includes an input validation parameter and wherein the instructions, when executed by the one or more processors, further cause the one or more processors to:
    generate a server-side output file including instructions for implementing the input validation parameter.

17. The non-transitory computer-readable medium of claim 10, wherein the one or more output files comprise a software development kit based on the target programming language, the software development kit containing the code and defining the one or more of the API endpoints and respective input and output data types.

18. The non-transitory computer-readable medium of claim 10, wherein the instructions, when executed by the one or more processors, further cause the one or more processors to:
    determine that the API specification complies with API specification formatting guidelines; and
    generate the representation of the API specification according to the formatting guidelines.

19. A system comprising:
one or more processors; and
memory including instructions that when executed by the one or more processors, cause the system to:
    receive an API specification defining API endpoints using data types that are supported in a plurality of programming languages, the data types comprising structs and tagged unions defining respective input data types and output data types for the API endpoints, the API specification being generated in a language that supports struct and tagged union data types;
    input at least a portion of the API specification into an API engine configured to process and convert the at least the portion of the API specification into a target programming language, the target programming language being selected from the plurality of programming languages;
    process and convert, by the API engine, the at least the portion of the API specification into the target programming language, to yield a representation of the at least the portion of the API specification in the target programming language; and
    generate, by the API engine, one or more output files based on the representation of the at least the portion of the API specification, the one or more output files defining one or more of the API endpoints and respective input and output data types, the one or more output files comprising code in the target programming language for communicating data via the API endpoints based on the respective input and output data types and a particular serialization format.

20. The system of claim 19, wherein the one or more output files comprise a software development kit based on the target programming language, the software development kit containing the code and defining the one or more of the API endpoints and respective input and output data types.

* * * * *